United States Patent [19]

Harasaki et al.

[11] Patent Number: 4,909,565
[45] Date of Patent: Mar. 20, 1990

[54] FRONT BODY CONSTRUCTION

[75] Inventors: Hayatsugu Harasaki; Makoto Ikegami; Tadashi Udo, all of Hiroshima, Japan

[73] Assignee: Mazda Motor Corporation, Hiroshima, Japan

[21] Appl. No.: 181,944

[22] Filed: Apr. 15, 1988

[30] Foreign Application Priority Data

Apr. 17, 1987 [JP] Japan ................... 62-95777
Apr. 17, 1987 [JP] Japan ................... 62-95778
Apr. 17, 1987 [JP] Japan ................... 62-95779

[51] Int. Cl.$^4$ .............................. B62D 21/00
[52] U.S. Cl. ...................... 296/189; 296/198
[58] Field of Search .......... 296/194, 193, 189, 188, 296/198, 204, 203

[56] References Cited

U.S. PATENT DOCUMENTS

| | | | |
|---|---|---|---|
| 4,406,343 | 9/1983 | Harasaki | 296/194 X |
| 4,466,653 | 8/1984 | Harasaki | 296/203 |
| 4,542,934 | 9/1985 | Komatsu et al. | 296/194 |
| 4,560,198 | 12/1985 | Katano et al. | 296/198 |
| 4,573,734 | 3/1986 | Gass | 296/189 |
| 4,669,777 | 6/1987 | Harasaki et al. | 296/194 |
| 4,723,811 | 2/1988 | Harasaki | 296/188 |
| 4,753,315 | 6/1988 | Fujisaki et al. | 296/194 X |
| 4,763,948 | 8/1988 | Harasaki | 296/194 |

FOREIGN PATENT DOCUMENTS

| | | | |
|---|---|---|---|
| 2432370 | 1/1976 | Fed. Rep. of Germany | 296/188 |
| 55-114772 | 9/1980 | Japan . | |
| 0105780 | 5/1987 | Japan | 296/194 |

*Primary Examiner*—Margaret A. Focarino
*Assistant Examiner*—Frank H. Williams, Jr.
*Attorney, Agent, or Firm*—Fleit, Jacobson, Cohn, Price, Holman & Stern

[57] ABSTRACT

A front body construction of a vehicle includes a lengthwise front side frame welded to the lower periphery of each of left and right wheel houses in the form of a substantially quatered spherical segment. Inner and outer extension frames different in length extend from the front side frame and are laterally spaced apart from each other. To the outer extension frame an apron frame welded to an outer edge of the wheel house is welded at its lower end. A frontal impact force is received by the inner and outer extension frames, specifically by the longer one at first and, then, by the shorter one when a buckling or crushing is caused in the longer one due to frontal impact force.

16 Claims, 6 Drawing Sheets

FRONT BODY CONSTRUCTION

BACKGROUND OF THE INVENTION

The present invention relates to a front body construction of a vehicle which is capable of absorbing effectively an impact force caused upon the vehicle crashing.

There are many known front body constructions of vehicles in the art. Generally, the known front body construction includes left and right front side frames extending lengthwise and connected to lower peripheries of left and right wheel houses, respectively, and left and right apron frames extending lengthwise and connected to upper peripheries of the left and right wheel houses, respectively. These front side frames and apron frames terminate at the same location in a lengthwise direction. One such front body construction is disclosed in, for example, Japanese Utility Model Unexamined Publication No. 55- 114,772.

Meanwhile, there are two somewhat conflicting requirements that govern the mechanical strength of front body construction and the ability of absorbing impact force upon a car crash. Specifically, the front body has to be resistant to road shock when traveling and, on the other hand, has to be liable to cause buckling or crushing in the front body upon a car crash. Because impact force produced upon a car crash is mainly absorbed by buckling or crushing caused in frames of the front body of a vehicle, if a frame work of the front body is designed to have an increased mechanical strength, it becomes more hard to absorb impact force exerted on the front body by the buckling or crushing caused in the frame and in such case of car crash, on the contrary, if designed to be apt to cause buckling, the front body becomes weak against road shock on ordinary driving.

In this regard, one disadvantage associated with the front body construction taught by the above mentioned Japanese Utility Model Unexamined Publication is that the front body construction having the front side and apron frames rigidly connected to each other at the same location in a lengthwise direction is too strong in mechanical strength and, thereby, difficult to cause easily buckling or crushing in order to absorb a frontal impact force upon a frontal car crash. For example, when a vehicle having such a front body crashes head on another vehicle or smashes into a solid construction, impact force received by the car body, in particular the front body, is simultaneously transmitted to and distributed in the front side frames and the apron frames. Owing to this distribution of impact force, these frames are hard to cause buckling, resulting in an insufficient ability of absorbing the frontal impact force.

OBJECT OF THE INVENTION

It is, therefore, an object of the present invention to provide a front body construction which can absorb frontal impact force efficiently while having enough mechanical strength.

SUMMARY OF THE INVENTION

The above and other objects of the present invention are performed by providing a front body construction that comprises a front side frame extending lengthwise provided with inner and outer extension frames different in length both of which extend in the forward direction therefrom and are disposed substantially in parallel with each other, the outer extension frame being on the lengthwise extension of a line passing through the front wheel.

According to the front body construction of the present invention, when the vehicle crashes head on another vehicle or smashes into a solid construction, the longer one of the inner and outer extension frames receives a frontal impact force exerted on the car body, in particular the front body and causes therein a buckling or is crushed short, thereby absorbing the frontal impact force so as to prevent a driver's compartment from being subjected to a considerable shock or damage. If the frontal impact force is too great to be absorbed only by the longer extension frame, the shorter one of the inner and outer extension frames receives the impact force as well as the longer one. Consequently, the impact force is distributed in the inner and outer extension frames and absorbed as a result of the buckling caused in the inner and outer extension frames. In many cases, the shorter one of the inner and outer extension frames will strikes the front wheel when a buckling is caused therein, relieving the shock.

BRIEF DESCRIPTION OF THE DRAWINGS

The above and other objects and features of the present invention will be apparent from the following description of the preferred embodiment taken with reference to the accompanying drawings in which.

DETAILED DESCRIPTION OF THE INVENTION

Because engine body constructions are well known, the present description will be directed in particular to elements forming parts of, or cooperating with, the novel construction in accordance with the present invention. It is to be understood that elements not specifically shown or described can take various forms well known to those skilled in the vehicle art.

It should be noted that the words "front" and "rear" in this specification indicate directions toward the forward end and back end of a vehicle, respectively, and the word "lengthwise" means a direction extending from the "front" to the "rear".

Figure 1:
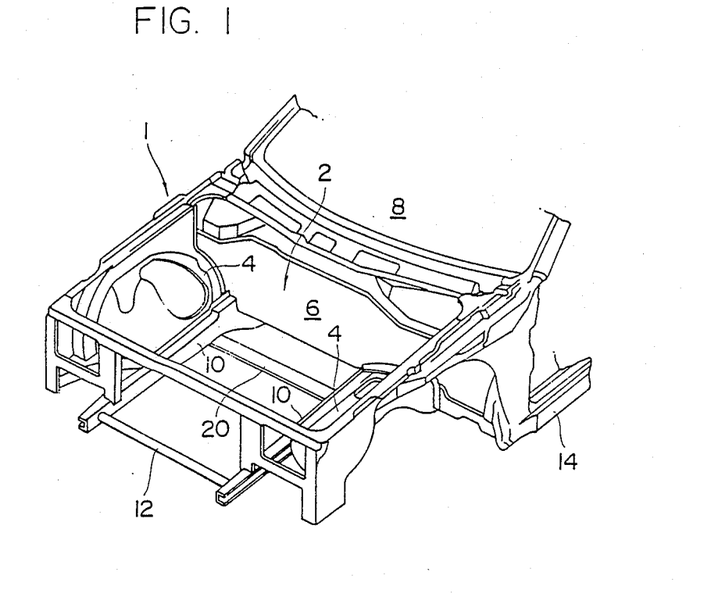
FIG. 1 is a fragmentary perspective view illustrating a front body of a car body embodying the present invention.

Before describing the present invention in detail, reference is had to FIG. 1 for the purpose of providing a brief description of a front body construction that will enhance an understanding of an internal construction of the front body. As shown, the front body 1 of a monocoque type car body, in which formed is an engine room 2 for mainly an engine with its associated elements installed therein, consists of left and right side wheel houses 4 forming parts of side walls of the engine room 2 and a lower dash board 6 as a partition wall separating the engine room 2 and a driver's compartment 8. These wheel houses 4 are connected along their lower side margins to left and right front side frame assemblies 10 extending in a lengthwise direction from the forward to the rear end of the front body 1, respectively, and at their rear ends to the lower dash board 6, in a well known manner, such as, spot welding. These left and right front side frames 10 shaped in the form of a U-channel are welded to the lower dash board 6 at their rear end and connected to each other at their forward ends by a front cross member 12 extending therebetween. Behind each of the front side frames 10 there is a torque box 7 ( see FIG. 2A ) attached to the dash board 6 to which a side sill 14 extending in a lengthwise direction is connected.

Figure 2A:
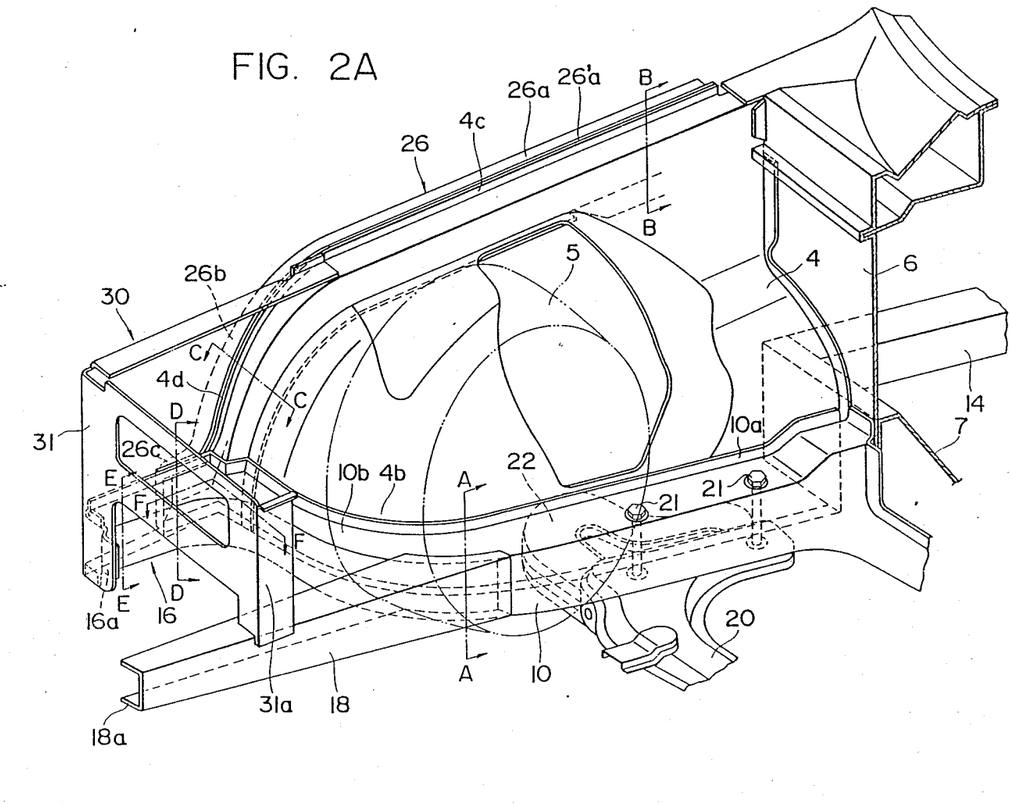
FIG. 2A is a perspective view showing the left side part of the front body of FIG. 1.
Figure 2B:
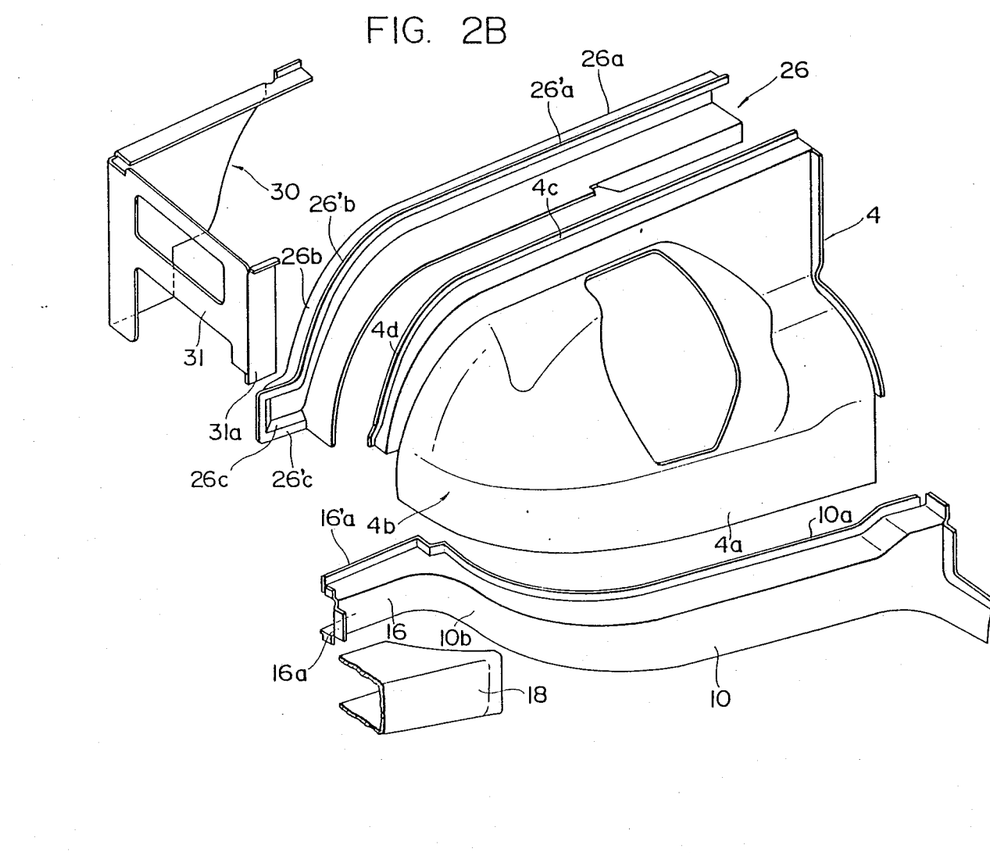
FIG. 2B is an exploded view showing the left side part of the front body of FIG. 1.
Figure 3:
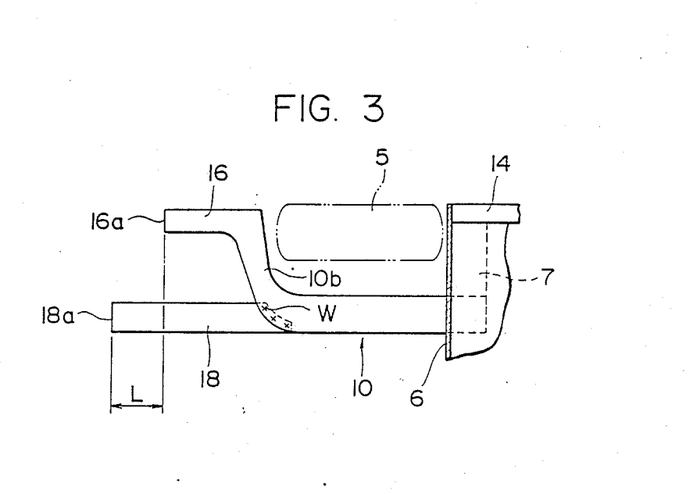
FIG. 3 is a fragmentary plane view showing a front side frame assembly of the left side part of the front body of FIG. 1.
Figure 4A:
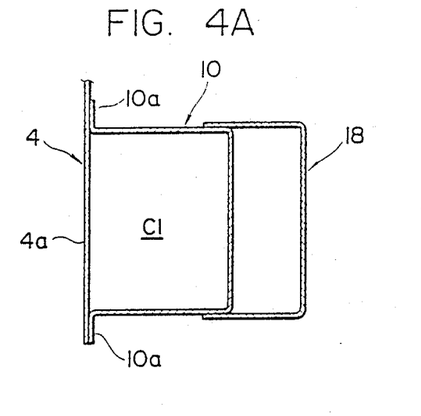
FIG. 4A is a cross sectional view taken along a line A—A in FIG. 2A.

Referring now to FIGS. 2A, 2B and 3 wherein only the left side part of the front body 1 of FIG. 1 is shown in detail, the wheel house 4 is shaped in the form of a substantially quatered spherical segment so as to cover more than half of a front wheel 5. This wheel house 4 is connected along its lower margin 4a to upper and lower flanges 10a of the front side frame 10 shaped in the form of a U-channel at various points in a well known manner such as spot welding so as to form a closed cross section C1 therebetween as is shown in FIG. 4A. This front side frame assembly 10, as is fragmentarily shown in FIG. 3, is generally shaped in the form of a fork having first or outer and second or inner front extension frames 16 and 18 substantially in parallel with each other but different in length. The first or outer extension frame 16 which is shorter than the second or inner extension frame 18 is formed integrally with the front side frame 10. Part 10b extending between the outer extension frame 16 and the front side frame 10 is curved to surround and is welded to a rounded front lower section 4b of the wheel house 4. On the other hand, the inner extension frame 18, which is shaped in the form of a U-channel and made separately from the front side frame 10, is welded to the curved part 10b of the front side frame 10 at several points W as is shown in FIG. 3. The inner extension frame 18, which is aligned with the front side frame 10 in a straight line, has its front end 18a away forwardly from the front end 16a of the outer extension frame 16 by a distance L.

Bolted at 21 to the front side frame 10 is a cross member 20 which pivots at opposite outer ends left and right suspension arms or lower control arms 22 for swing-up and -down motion. As is well known in the art, the front wheel 5 is attached to each suspension arm 22 through a front axle ( not shown ).

Figure 4B:
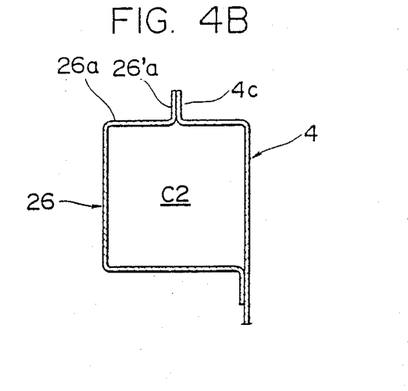
FIG. 4B is a cross sectional view taken along a line B—B in FIG. 2A.
Figure 4C:
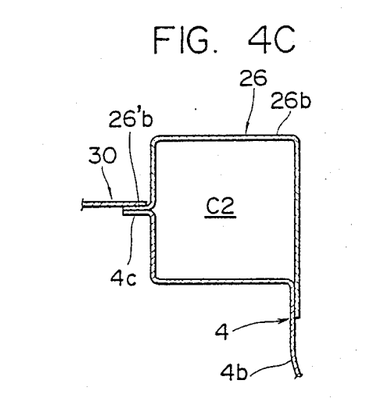
FIG. 4C is a cross sectional view taken along a line C—C in FIG. 2A.
Figure 4D:
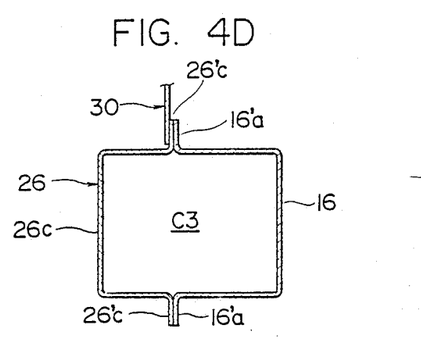
FIG. 4D is a cross sectional view taken along a line D—D in FIG. 2A.

An apron frame 26 in the form of a U-channel consists of two integral sections; namely a straight frame section 26a with a flange 26'a extending in a lengthwise direction along and attached to an upper side flange 4c of the wheel house 4, and a front frame section 26b with a flange. 26–b rounded downwardly and attached to a rounded side flange 4d of the rounded front lower section 4b of the wheel house 4. This apron frame 26 may be welded to the flanges 4c and 4d of the wheel house 4 at various points in a well known manner such as spot welding so as to form a closed rectangular cross section C2 therebetween as is shown in FIGS. 4B and 4C. The rounded front frame section 26b of the apron frame 26 has a short front extension 26c with upper and lower flanges 26'c welded to upper and lower flanges 16a of the outer extension frame 16 so as also to form a closed rectangular cross section C3 as is shown in FIG. 4D.

Figure 4E:
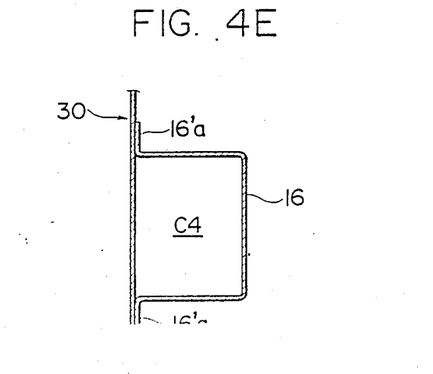
FIG. 4E is a cross sectional view taken along a line E—E in FIG. 2A.
Figure 4F:
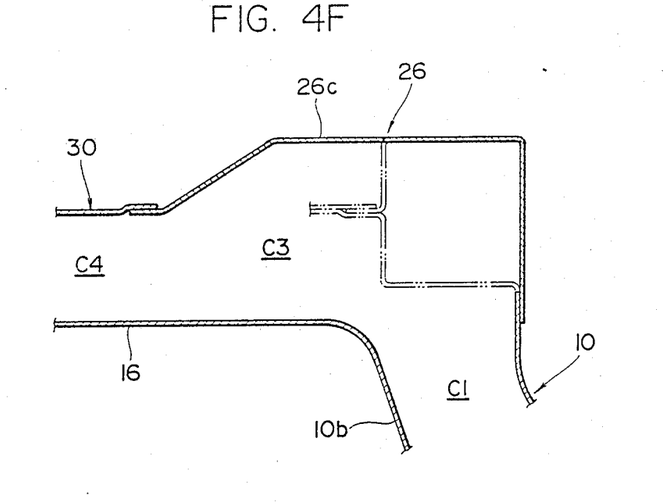
FIG. 4F is a cross sectional view taken along a line F—F in FIG. 2A.
Figure 5A:
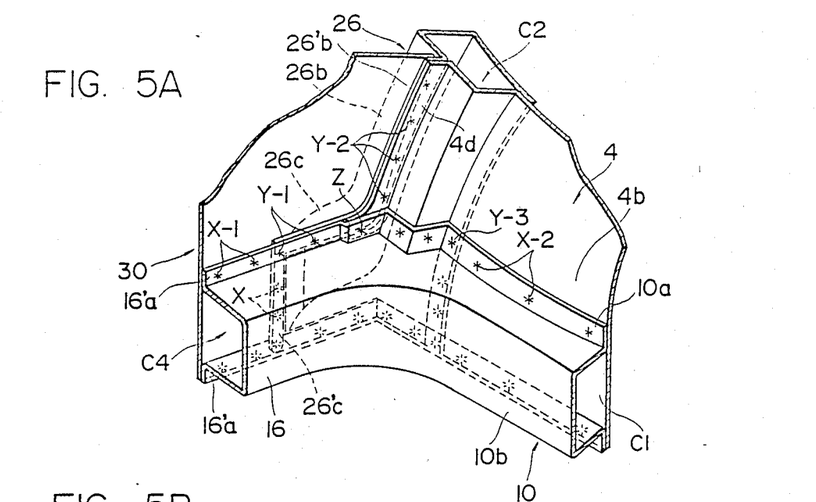
FIG. 5A is a perspective view partially showing a front side section of the left side part of FIG. 2B.
Figure 5B:
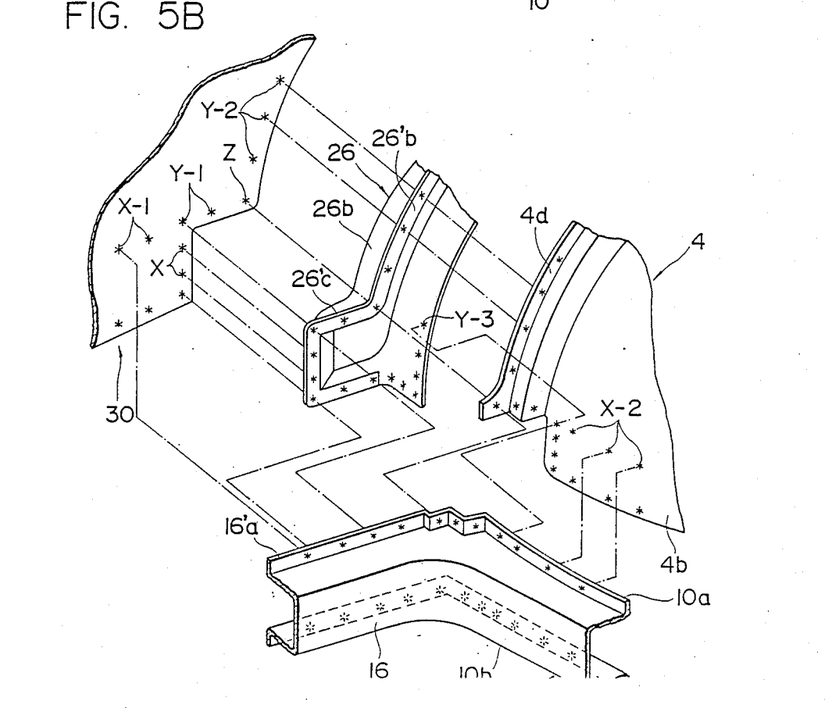
FIG. 5B is an exploded view showing the same parts as FIG. 5A.

Disposed in front of the wheel house 4 is a wheel apron 30 forming a part of a side wall of the front body 1 which is welded to the flange 26'b of the rounded front frame section 26b of the apron frame 26 at various points and the outer extension frame 16. Between the wheel apron 30 and the outer extension frame 16 there is formed a closed rectangular cross section C4 as is shown in FIG. 4E. As is shown in more detail in FIGS. 5A and 5B, the wheel apron 30, the outer extension frame 16, the side frame 10, the rounded front frame section 26b of the apron frame 26 and the rounded front section 4b of the wheel house 4 are welded to one another at various points X, Y and Z. Specifically, the wheel apron 30 is welded directly to the upper and lower flanges 16'a of the outer extension frame 16 at points X-1, to the upper and lower flanges 16'a of the outer extension frame 16 through the upper and lower flanges 26'c of the short front extension 26c at points Y-1, to the upper and lower flanges 16'a of the outer extension frame 16 through both of the flange 26'b of the rounded front frame section 26b of the apron frame 26 and the side flange 4d of the rounded front lower section 4b of the wheel house 4 at points Z, and to the side flange 4d of the rounded front lower section 4b of the wheel house 4 through the flange 26'b of the rounded front frame section 26 of the apron frame 26 at points Y-2. The inner margin of the rounded front frame section 26b of the apron frame 26 is welded to the upper and lower flanges 10a of the curved part 10b of the front side frame 10 through the rounded front lower section 4b of the wheel house 4 at points Y-3. The rounded front lower section 4b of the wheel house 4 is welded directly to the upper and lower flanges 10a of the curved part 10b of the front side frame 10 at points X-2. Owing to the frame construction described above, the outer extension frame 16 and the curved part 10b of the front side frame 10 form the successive closed cross sections C1, C3 and C4 in cooperation with the wheel house 4, the apron frame 26 and the wheel apron 30 as is shown in FIG. 4F.

The wheel apron 30, as is best seen in FIG. 2B, is integrally formed with a shroud panel 31 bent inwardly and having an inner side flap 31a bent back. The inner side flap 31a is welded to the inner extension frame 18 at its lower edge. Because this wheel apron 30 is formed separately from the apron frame 26, it is easy to handle these wheel apron 30 and apron frame 26 and to weld them to the wheel house 4.

When the vehicle with the front body construction as described above is traveling on a road, road shock receiving by the front body is ordinarily transmitted to the front side frames 10 through the wheels 5, the suspension arms 22 and the cross member 20. Such a road shock transmitted to the front side frame 10 is, because the outer extension frame 16 which is a part of the front side frame 10 is rigidly connected to the apron frame 26, further transmitted to the apron frame 26 and the wheel house 4 so as to be distributed effectively in these constructional members.

Road shock transmitted to the apron frame 26 through a suspension strut ( of which operation and construction is well known to those skilled in the art and need not be shown and explained herein ) is also transmitted to the front side frame 10, thereby distributed in the apron frame 26 and the front side frame 10. By virtue of such an effective distribution of road shock, the front body 1 has an increased structural rigidity against road shock.

On the other hand, if the vehicle crashes head on into another vehicle or smashes into a solid construction, the car body, especially the front body, will be subjected to a great frontal impact force. The inner extension frame 18 of the front side frame 10 receives such a great impact force and causes a buckling therein or is crushed short. As a result of this buckling of the inner extension frame 18, the impact force is partly or fully absorbed, so that the driver's compartment is prevented from being subjected to such a great impact force and being damaged.

If the impact force is too large to be fully absorbed only by the buckling of the inner extension frame 18 to a shortened length equal to about the original length minus L, than the outer extension frames 16, together with the inner extension frames 18, receive the impact force which causes a buckling in both frames 16 and 18 so as to absorb the impact force.

When the impact force exerted on the front body is considerably great, it will be hard to completely absorb the force as a result of the occurrence of buckling in the outer and inner extension frames 16 and 18. In this case, simultaneously with the occurrence of buckling in the outer extension frame 16, the curved part 10b of the front side frame 10 is bent back together with the rounded front section 4b of the wheel house 4. Due to this bending of the curved part 10b of the front side frame 10 and the rounded front section 4b of the wheel house 4, the impact force is absorbed to some extent. If the curved section 10b of the front side frame 10 bends a large amount, the curved part 10b of the front side frame 10 and the rounded front section 4b of the wheel house 4 will hit against the front wheel 5 attached to the car body by means of the suspension arm 22. Consequently, the impact force is absorbed by the front wheel, in particular the elastic tire thereof, thereby being absorbed fully, so that the driver's compartment is prevented from being subjected to a considerably large impact force and being damaged. In such a way, the impact force exerted on the front body is absorbed in three or four steps owing to the provision of the inner and outer extension frames 16 and 18 different in length.

Figure 6:
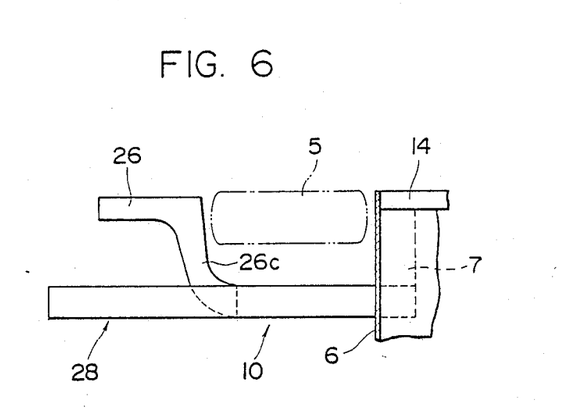
FIG. 6 is a fragmentary plane view, similar to FIG. 3, showing a modification of the front side frame assembly.

As is shown in FIG. 6, it is permissible to form an inner extension frame 28 integrally with the front side frame 10 in a straight line and to attach a separately formed outer extension frame 26 with an inwardly curved part 26c integral therewith to the front side frame 10. Alternatively, it is permissible to form an integral extension frame member having inner and outer extension frames different in length separately from the front side frame 10 and to attach it to the front side frame 10. It is also permissible to make the inner extension frame 18, 28 shorter than the outer extension frame 16, 26.

What is claimed is:

1. A front body construction of a vehicle having a front wheel house having a curved portion for covering a front wheel comprising:
   an elongated front side frame extending in a lengthwise direction of said front body and disposed along and secured to a lower periphery of said front wheel house;
   an outer extension frame extending from said front side frame in a laterally offset manner to extend forwardly in front of said front side frame substantially in parallel with said front side frame, said front wheel being located on the extension of a straight line extending rearwardly of said outer extension frame; and
   an inner extension frame extending from said front side frame on an extension of a straight line extending from said front side frame, said inner extension frame having a forward end extending forwardly from a forward end of said outer extension frame so as to produce a stepwise collapse by frontal shock, first, at said inner extension frame, second, at said outer extension frame, and third, if sufficient force is involved, against the front wheel.

2. A front body construction as defined in claim 1, wherein said outer extension frame is longer than said inner extension frame.

3. A front body construction as defined in claim 1, wherein said outer extension frame is located in front of the front wheel of the vehicle.

4. A front body construction as defined in claim 1, wherein said inner extension frame is made separately from and is attached to said front side frame.

5. A front body construction as defined in claim 1, wherein said outer extension frame is made separately from and is attached to said front frame section.

6. A front body construction as defined in claim 1, wherein said outer and inner extension frames are integrally made as one body and are attached to said front side frame.

7. A front body construction as defined in claim 1, further comprising a shroud panel connected to said inner extension frame at a middle portion and to which a forward end of said outer extension frame is connected.

8. A front body construction of a vehicle having a wheel house for covering a front wheel comprising:
   a front side frame assembly having a front side frame extending along a lower periphery of said wheel house and laterally offset outer and inner extension frames extending, in parallel with each other, from said front side frame;
   an apron frame attached to an outer edge of said wheel house and said outer extension frame; and
   an apron panel disposed outside said wheel house, and attached to said apron frame and said outer extension frame so as to form a side wall of said front body;
   said outer extension frame being shaped in a U-shaped cross section, surrounding a rounded lower section of said wheel house to form a closed cross section therebetween, being connected to said rounded lower section of said wheel house and said apron frame and having a forward end extending rearwardly from a forward end of said inner extension frame.

9. A front body construction as defined in claim 8, wherein said front side frame, inner extension frame and apron frame are each shaped in the form of a U-channel so as to form a rectangular cross section in cooperation with said wheel house and said apron panel.

10. A front body construction as defined in claim 8, wherein said apron panel is integrally formed with an inwardly bent section forming a shroud panel.

11. A front body construction as defined in claim 10, wherein said shroud panel is attached at its inner end of said inner extension frame.

12. A front body construction as defined in claim 8, wherein at least one of said inner and outer extension frames is made separately from and is attached to said front side frame.

13. A front body construction as defined in claim 8, wherein a forward end of said outer extension frame extends forwardly from a forward end of said apron frame.

14. A front body construction of a vehicle comprising,
- a front wheel house shaped in the form of a substantially quartered spherical segment for covering a front wheel,
- a front side frame extending in a lengthwise direction of said a front body and having front part bent outwardly around a front lower part of said front wheel house,
- an outer extension frame extending forwardly in said lengthwise direction from said front part of said front side frame in a laterally offset manner and substantially in parallel with said front side frame, having a U-shaped cross section and attached to a lower portion of said wheel house to form a closed cross section, said front wheel being located on an extension of a straight line extending rearwardly of said outer extension frame,
- an apron frame attached to an upper edge of said wheel house, said apron frame having a front part that is bent and extending downwardly around said front part of said front wheel house and is attached to said front part of said front side frame, and
- an apron panel disposed outside said wheel house and attached to said apron frame and said outer extension frame so as to form a side wall of said front body.

15. A front body construction as defined in claim 14, wherein said front side frame and apron frame are shaped each to form a closed cross section with said wheel house.

16. A front body construction as defined in claim 15, wherein the front part of said front side frame is provided with an extension laterally spaced from and extending in parallel with said front side frame.

* * * * *